Figures 1, 2:
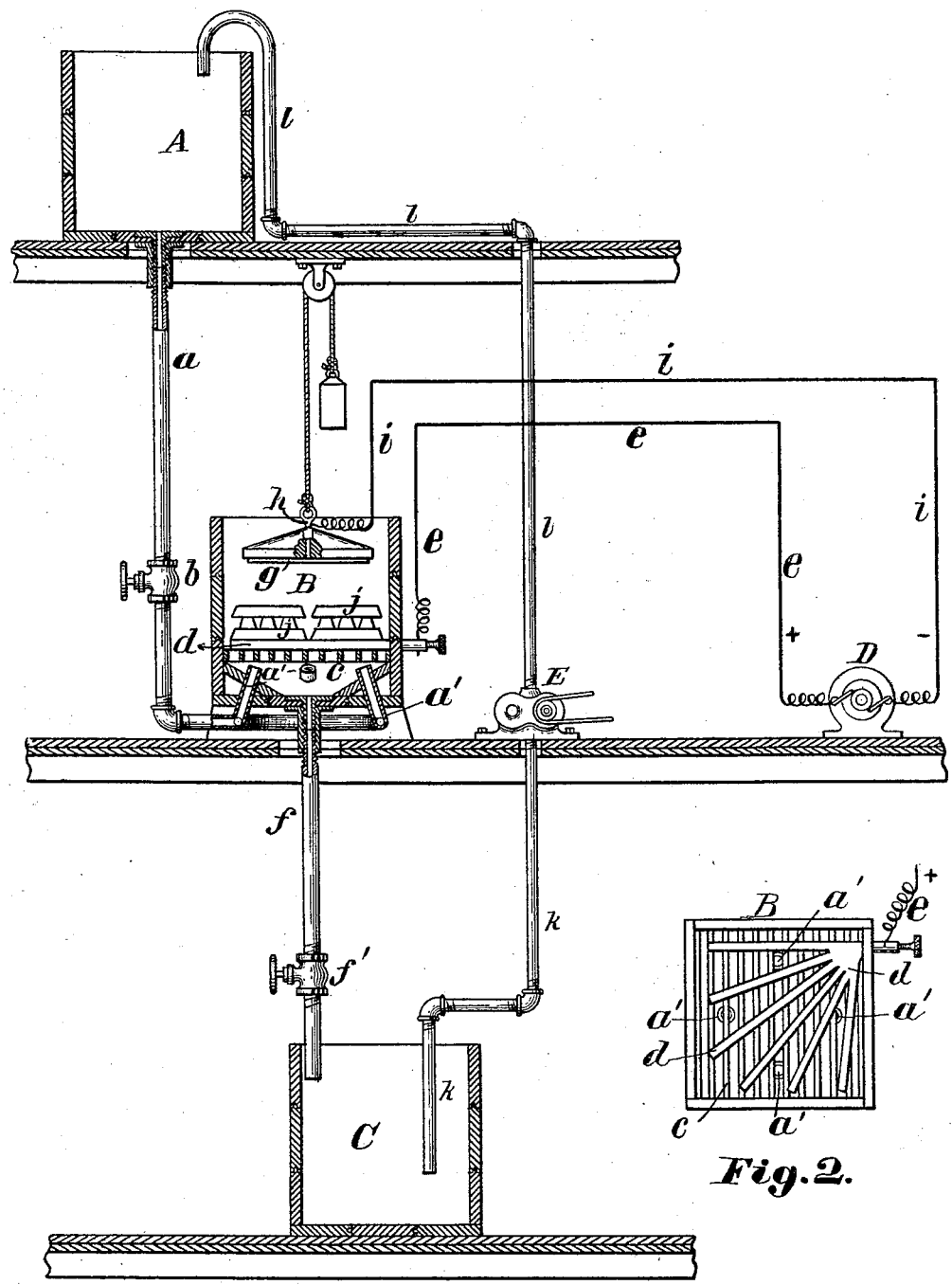

(No Model.)

A. B. BROWNE.
PROCESS OF MANUFACTURING WHITE LEAD.

No. 496,109. Patented Apr. 25, 1893.

Witnesses.
Geo. A. Sewall
Geo. Derry

Inventor.
Arthur B. Browne
by N. C. Lombard
Attorney.

UNITED STATES PATENT OFFICE.

ARTHUR BENJ. BROWNE, OF CAMBRIDGE, MASSACHUSETTS, ASSIGNOR, BY MESNE ASSIGNMENTS, TO THE AMERICAN LEAD COMPANY, OF KITTERY, MAINE.

PROCESS OF MANUFACTURING WHITE LEAD.

SPECIFICATION forming part of Letters Patent No. 496,109, dated April 25, 1893.

Application filed August 11, 1892. Serial No. 442,821. (No specimens.)

*To all whom it may concern:*

Be it known that I, ARTHUR BENJ. BROWNE, of Cambridge, in the county of Middlesex and State of Massachusetts, have invented a new and useful Process of Manufacturing White Lead, of which the following, taken in connection with the accompanying drawings, is a specification.

My invention relates to processes of manufacturing white lead. The process of manufacturing white lead hereinafter described, I believe to be radically new and altogether unlike any process heretofore practiced. By means of my invention, white lead may be produced in much less time and with a material reduction in the cost of manufacture, as compared with the best processes now in general use.

My invention consists in placing a body of metallic lead to be acted upon in a solution of a nitrate of an alkaline base which, under the influence of an electric current, will separate into a solvent of lead at one pole and an alkaline hydrate at the other pole, and simultaneously electrolyzing said solution by causing a current of electricity to flow from the metallic lead through said solution, whereby a lead hydrate is precipitated, and finally allowing said lead hydrate to dry in the air or other atmosphere containing carbonic acid.

My invention further consists in placing the metallic lead to be acted upon in a suitable vessel, and in electric connection with the positive side of a source of electric force to form the anode of the bath, causing a solution of a nitrate of an alkaline base, which under the influence of an electric current will separate into a solvent for lead at the anode and an alkaline hydrate at the cathode, to flow into said vessel and over and around said metallic lead until said anode and cathode are submerged, causing a current of electricity to flow from said anode through said solution to produce the necessary reactions to dissolve said anode and form a soluble salt of lead, causing said salt of lead to be precipitated to form a lead hydrate; causing said solution, holding in suspension the lead hydrate, to flow into the settling tank or vessel, allowing the lead hydrate to settle; drawing off the solution from which the lead hydrate has been precipitated; and then exposing it to an atmosphere containing carbonic acid and allowing it to dry, when it is ready to be ground in oil and placed upon the market.

Figure 1 of the drawings is a vertical section through portions of three floors of a building and parts of my apparatus, other parts being shown in elevation. Fig. 2 is a plan of the electrolyzing tank, with the cathode and the metallic lead which forms the anode removed.

For the proper working of my improved process I employ a supply tank A having a discharge pipe $a$ opening from its bottom, and provided with a valve $b$ to control the delivery through said discharge pipe. A second tank B is arranged, preferably at a lower level than the tank A, in a convenient position to receive the discharge from said tank A through its bottom by means of the induction pipes $a'$ $a'$ communicating with the pipe $a$ as shown. The bottom of the tank B is preferably made inclined in all directions toward the center, and it is also provided with a grating $c$ above said inclined bottom, upon which is placed the spider-like or skeleton frame $d$, made of aluminum or other suitable conducting and acid proof material, which is connected by the wire $e$ to the positive side of a dynamo D, or other suitable source of electric force. The tank B is provided with a discharge pipe $f$, opening from the center of its bottom, and extending to and discharging into the settling vessel or tank C, arranged preferably at a lower level than said tank B, said pipe $f$ having a valve $f'$ for controlling the flow of the liquid from the tank B to the tank C. The tank B has adjustably suspended therein, at a suitable distance from the grating $c$ and the skeleton frame $d$, the cathode $g$, the body of which is preferably made of wood covered on its under side with a plate of lead in contact with the eyebolt $h$ or other means of suspension, which is connected by the wire $i$ to the negative side of the dynamo D, or other source of electric force.

In carrying out my invention I charge the supply tank A with a solution of a nitrate of an alkaline base, preferably nitrate of soda dissolved in water, though a solution of an acetate of an alkaline base may be used with a good degree of success, if desired. The metallic lead to be operated upon is placed upon the skeleton frame $d$ as shown at $j$, and becomes the anode of the electric circuit, and then the valve $b$ is opened to allow the solution in the supply tank A to flow into the electrolyzing tank B until the anode and cathode are submerged in said solution, the valve $f'$ in the meantime remaining closed. The electric circuit is now closed, causing a current of electricity to flow through the anode and the solution to the cathode, which immediately causes reaction to take place and the salt or salts of the solution to be decomposed into nitric acid and alkaline hydrate, the acid going to, and dissolving the anode to form a soluble salt of lead, while the alkaline hydrate accumulates around the cathode until disturbed by the flow of the solution toward said cathode, which causes said alkaline hydrate to mix with the soluble salt of lead thereby precipitating hydrate of lead. When these reactions have fairly commenced the valve $f'$ is opened to allow the solution, holding the hydrate of lead in suspension, the flow into the settling tank C, where after a while said lead hydrate will settle at the bottom of said tank leaving the solution in the upper portion of said tank clear, and in substantially its original condition, and fit to be transferred to the supply tank A and used over again. To accomplish this transfer I employ a pump E, provided with the suction pipe $k$ and the delivery pipe $l$, of any well known construction.

The lead hydrate produced as above described possesses the property of rapidly absorbing carbonic acid gas from the air, which is commences to do as soon as the solution is drawn off, thereby forming a hydrated carbonate of lead. If the absorption from the air should not prove rapid enough for commercial purposes, the hydrated lead may be exposed to an atmosphere of carbonic acid gas generated artificially by any well known means, such, for instance, as the action of an acid upon marble dust.

While I have shown and described the metallic lead, which serves as the anode of the electric circuit, near the bottom of the tank with the cathode above it, and the pipe or pipes, for delivering the solution from the supply tank to the electrolyzing tank, entering said tank at its bottom, which is the arrangement I prefer as being the most convenient, I do not wish to be confined to this particular arrangement, as the positions of the anode and cathode may be reversed, or they may be placed at opposite sides of the tank, care being taken that the current of electricity and the inflowing current of the solution entering said electrolyzing tank shall move substantially in the same direction therein. Neither do I wish to be confined to the use of a solution of a nitrate of an alkaline base, as I may use any other salt which is separated by electrolysis into a solvent for lead at one pole and an alkaline hydrate at the other as for instance, an acetate of an alkaline base. In the use of an acetate of an alkaline base, the reaction caused by the flow of the electric current through the solution, from the anode to the cathode, will be a separation of the solution into acetic acid and an alkaline hydrate; the acid will go to and attack the anode and dissolve the same, forming lead acetate, and the alkaline hydrate will accumulate, as before described, around the cathode, and being mixed with the lead acetate by the agitation of the solution caused by the inflowing current will precipitate lead hydrate as before described, the process being substantially the same, whatever salt of this class is used. As, however, there are commercial and other objections to the use of the acetates above described, I prefer the use of the nitrates hereinbefore mentioned.

The solution may be composed of any single one of the salts before mentioned, or of a combination of two or more of said salts if desired, without departing from the principles of my invention.

What I claim as new, and desire to secure by Letters Patent of the United States, is—

1. The process of manufacturing white lead, which consists in placing a body of metallic lead to be acted upon, in a solution of a nitrate of an alkaline base, which, under the influence of an electric current will separate into a solvent of lead at one pole and an alkaline hydrate at the other pole, and simultaneously electrolyzing said solution by causing a current of electricity to flow from the metallic lead through said solution whereby a lead hydrate is precipitated, and finally allowing said lead hydrate to dry in the air or other atmosphere containing carbonic acid.

2. The process of manufacturing white lead, which consists in placing the metallic lead to be acted upon in a suitable vessel, and in electric connection with the positive side of a source of electric force to form the anode of the bath; causing a solution of a nitrate of an alkaline base, which under the influence of an electric current will separate into a solvent for lead at the anode, and an alkaline hydrate at the cathode, to flow into said vessel and submerge said anode and the cathode; causing a current of electricity to flow from said anode and through the solution to produce the necessary reactions to dissolve said anode and form a soluble salt of lead, causing said salt of lead to be precipitated to form a lead hydrate; causing said solution, holding in suspension the lead hydrate, to flow into the settling tank or vessel; allowing the lead hydrate to settle; drawing off the solution from which the lead hydrate has been precipitated; and then exposing said lead hydrate to an atmosphere containing carbonic acid gas and allowing it to dry.

In testimony whereof I have signed my name to this specification, in the presence of two subscribing witnesses, this 4th day of August, A. D. 1892.

ARTHUR BENJ. BROWNE.

Witnesses:
N. C. LOMBARD,
GEO. A. SEWALL.